(12) United States Patent
Totsuka et al.

(10) Patent No.: US 11,225,136 B2
(45) Date of Patent: Jan. 18, 2022

(54) GRILLE SHUTTER

(71) Applicant: AISIN SEIKI KABUSHIKI KAISHA, Kariya (JP)

(72) Inventors: Shun Totsuka, Miyoshi (JP); Ken Komatsubara, Kariya (JP); Kazuki Tsuboi, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/907,376

(22) Filed: Jun. 22, 2020

(65) Prior Publication Data

US 2020/0406741 A1   Dec. 31, 2020

(30) Foreign Application Priority Data

Jun. 26, 2019  (JP) .............................. JP2019-118191

(51) Int. Cl.
*B60K 11/08* (2006.01)
*B60R 19/52* (2006.01)

(52) U.S. Cl.
CPC ............ *B60K 11/085* (2013.01); *B60R 19/52* (2013.01); *B60R 2019/527* (2013.01)

(58) Field of Classification Search
CPC ....... B60K 11/08; B60K 11/085; B60K 11/04; B60K 2019/525

USPC ....................................... 296/193.1; 180/68.1
See application file for complete search history.

(56) References Cited

U.S. PATENT DOCUMENTS

| 10,604,004 B2 | 3/2020 | Fujitani et al. |
| 2013/0000999 A1 | 1/2013 | Naito et al. |
| 2019/0001809 A1 | 1/2019 | Fujitani et al. |

FOREIGN PATENT DOCUMENTS

| JP | 2013-203315 A | 10/2013 |
| JP | 2019-10954 A | 1/2019 |
| JP | 6455557 B2 | 1/2019 |
| WO | WO 2012/086521 A1 | 6/2012 |

*Primary Examiner* — Dennis H Pedder
(74) *Attorney, Agent, or Firm* — Oblon, McClelland, Maier & Neustadt, L.L.P.

(57) ABSTRACT

A grille shutter includes a frame, a movable louver and a bracket provided at each of end portions of the frame. The frame includes an upper frame portion, a lower frame portion, a right frame portion and a left frame portion, wherein at least one of the upper frame portion and the lower frame portion includes a curved configuration in which a vehicle-rear-side edge of a portion of the one of the upper frame portion and the lower frame portion is convex towards a vehicle-front side, and the portion is positioned between the right frame portion and the left frame portion.

5 Claims, 4 Drawing Sheets

GRILLE SHUTTER

CROSS REFERENCE TO RELATED APPLICATIONS

This application is based on and claims priority under 35 U.S.C. § 119 to Japanese Patent Application 2019-118191, filed on Jun. 26, 2019, the entire content of which is incorporated herein by reference.

TECHNICAL FIELD

This disclosure generally relates to a grille shutter.

BACKGROUND DISCUSSION

A known technique is disclosed in JP2013-203315A (which will be hereinafter referred to as Patent reference 1), wherein left and right grille shutters (variable ducts) provided in a bumper face opening are arranged side by side with each other in a vehicle-left-and-right direction, and each of the left and right grille shutters is arranged such that an end portion at a central side in the vehicle-left-and-right-direction is arranged at a front side relative to an end portion at an outer side in the vehicle-left-and-right-direction.

In the known technique disclosed in Patent reference 1, however, the following issues arise. (i) A frame (frame body) of each of the left and right grille shutters includes a rectangular shape when viewed in an up-and-down direction. That is, both of a vehicle-front-side edge and a vehicle-rear-side edge of the frame of each of the left and right grille shutters are extended in a linear manner. Accordingly, rigidity of the frame is weak, and in a case where an external force including wind pressure works from the vehicle front side when the vehicle is normally running, the frame may be deformed or bent towards the vehicle rear side relatively easily.

(ii) In the known technique disclosed in Patent reference 1, each of the left and right grille shutters is arranged in the slanted manner such that the end portion at the central side in the vehicle-left-and-right-direction is arranged at the front side relative to the end portion at the outer side in the vehicle-left-and-right-direction. Thus, a length of the grille shutter in a vehicle-front-and-rear direction increases, which makes the technique unsuitable to be mounted on a vehicle of which the front overhanging is relatively short, typically represented by a minivan, for example.

A need thus exists for a grille shutter which is not susceptible to the drawback mentioned above.

SUMMARY

According to an aspect of this disclosure, a grille shutter configured to be mounted on a vehicle front portion includes a frame provided to extend in parallel to a vehicle-left-and-right direction, a movable louver supported by the frame, and a bracket provided at each of end portions of the frame and configured to be fastened to a vehicle body, the end portions corresponding to both end portions in the vehicle-left-and-right direction. The frame includes an upper frame portion provided to extend in the vehicle-left-and-right direction, and a lower frame portion provided at a lower side relative to the upper frame portion and extending in the vehicle-left-and-right-direction. The frame includes a right frame portion provided to extend in an up-and-down direction and connecting a right-side end portion of the upper frame portion and a right-side end portion of the lower frame portion to each other, the right-side end portions corresponding to right-side end portions in the vehicle-left-and-right direction. The frame includes a left frame portion provided to extend in the up-and-down direction and connecting a left-side end portion of the upper frame portion and a left-side end portion of the lower frame portion to each other, the left-side end portions corresponding to left-side end portions in the vehicle-left-and-right direction. At least one of the upper frame portion and the lower frame portion includes a curved configuration in which a vehicle-rear-side edge of a portion of the one of the upper frame portion and the lower frame portion is convex towards a vehicle-front side, and the portion is positioned between the right frame portion and the left frame portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
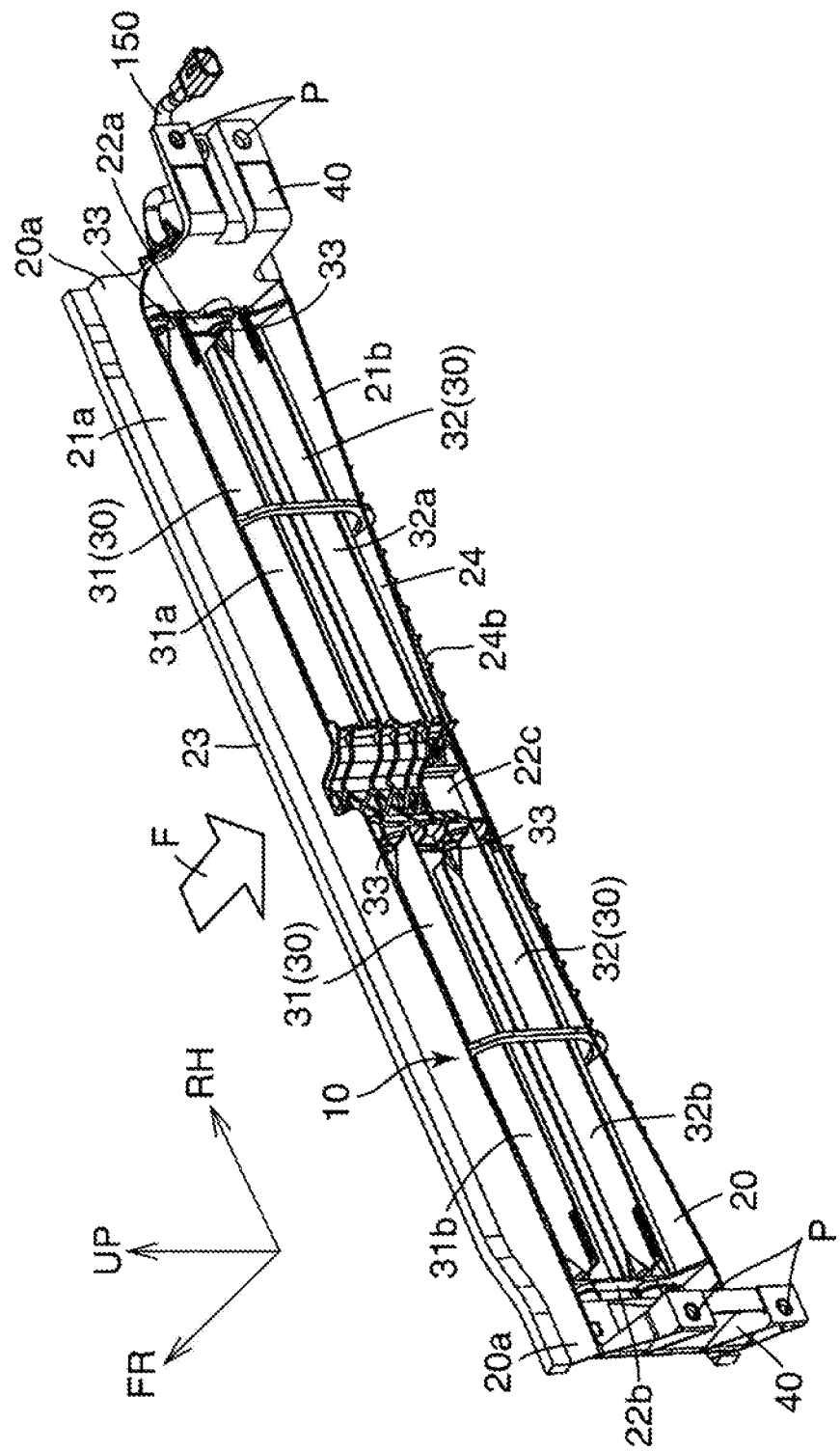
FIG. 1 is a perspective view of a grille shutter of an embodiment disclosed here, which is viewed from a diagonally rearward and above a vehicle.

A grille shutter according to an embodiment will be described with reference to the drawings. In the drawings, FR corresponds to a front side in a vehicle front-and-rear direction (front-and-rear direction), UP corresponds to an upper side in a vehicle up-and-down direction (up-and-down direction), and RH corresponds to a right side in a vehicle left-and-right direction.

Figure 3:
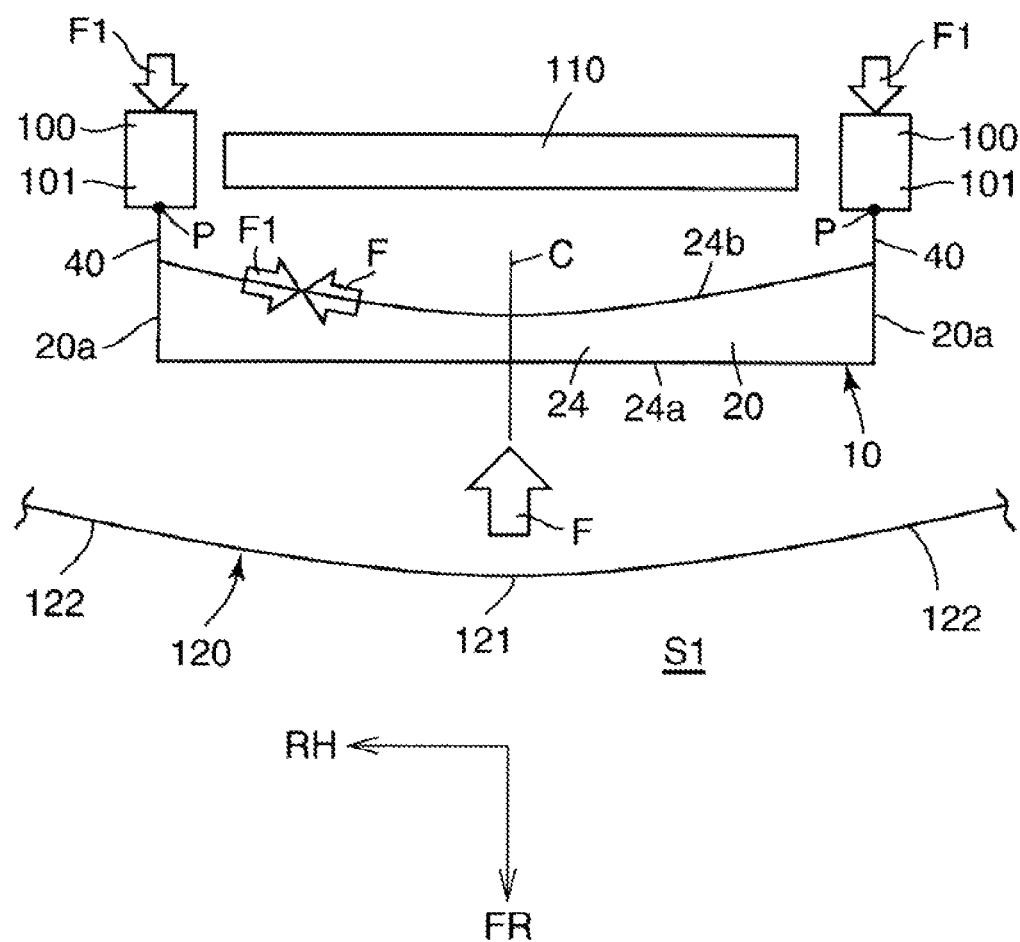
FIG. 3 is a schematic cross sectional view of the grille shutter and the surroundings thereof according to the embodiment, in which the presentation of the cross section is omitted for sake of clarification of the drawing.

FIG. 3 illustrates a grille shutter 10 of the embodiment and the surroundings of the grille shutter 10. The grille shutter 10 is configured to be provided at a front portion of a vehicle (at a back side of a bumper face 120). A radiator 110 for cooling engine cooling water is provided at a vehicle rear side of the grille shutter 10. The radiator 110 is supported by a vehicle body 100 made of metal. The vehicle body 100 includes a pair of radiator support side members 101, 101 each provided at an outer side in the vehicle left-and-right direction relative to the radiator 110 and extending in the vehicle up-and-down direction.

The bumper face 120 (front bumper face) is provided at a vehicle front side relative to the grille shutter 10 to extend in the vehicle-left-and-right-direction. The bumper face 120 is made of resin, for example. The bumper face 120 includes a bumper face central portion 121 in the vehicle-left-and-right-direction and bumper face end portions 122, 122 in the vehicle-left-and-right-direction. The bumper face central portion 121 is positioned at a vehicle front side relative to the bumper face end portions 122, 122, and accordingly the bumper face 120 includes a substantially arc shape in which the bumper face central portion 121 is convexed towards the vehicle front side when viewed in a planar view. The bumper face 120 includes a grille opening portion through which air in an outside space portion S1 at the vehicle front side may pass. It is configured that the air passed through the grille opening portion flows through the grille shutter 10 towards the radiator 110.

The grille shutter 10 is configured to control an amount of air passing through the grille opening portion of the bumper face 120 and flowing to the radiator 110. The grille shutter 10 is provided to extend linearly in parallel to or substantially parallel to the vehicle-left-and-right-direction. As illustrated in FIG. 1, the grille shutter 10 includes a frame 20, a movable louver 30 movably supported by the frame 20, and a bracket 40.

The frame 20 is made of resin, for example. The frame 20 is provided to extend in parallel to the vehicle-left-and-right direction. The frame 20 includes a frame shape of which a lengthwise direction is the vehicle-left-and-right direction when viewed from the vehicle front side. The frame 20 includes an upper frame portion 21a, a lower frame portion 21b, a right frame portion 22a and a left frame portion 22b. The frame 20 includes a central frame portion 22c arranged between the right frame portion 22a and the left frame portion 22b.

The upper frame portion 21a is provided at an upper end portion of the frame 20 to extend in parallel to the vehicle left-and-right direction. A sponge 23 is provided at an upper surface of the upper frame portion 21a, and the sponge 23 seals between the upper frame portion 21a and a bumper reinforcement provided at an upper side of the upper frame portion 21a. The lower frame portion 21b is provided at a lower side relative to the upper frame portion 21a to extend in parallel to the vehicle-left-and-right direction. Another sponge may be provided at a lower or bottom surface of the lower frame portion 21b, and the sponge may seal between the lower frame portion 21b and a second cross member provided at a lower side of the lower frame portion 21b. The right frame portion 22a is provided to extend in the vehicle up-and-down direction, and connect a right side end portion (including the vicinity thereof) of the upper frame portion 21a in the vehicle-left-and-right-direction and a right side end portion (including the vicinity thereof) of the lower frame portion 21b in the vehicle-left-and-right-direction to each other. The left frame portion 22b is provided to extend in the vehicle up-and-down direction, and connect a left side end portion (including the vicinity thereof) of the upper frame portion 21a in the vehicle-left-and-right-direction and a left side end portion (including the vicinity thereof) of the lower frame portion 21b in the vehicle-left-and-right-direction to each other. The central frame portion 22c is provided to extend in the vehicle up-and-down direction, and connects a central portion (including the vicinity thereof) in the vehicle-left-and-right-direction of the upper frame portion 21a and a central portion (including the vicinity thereof) in the vehicle-left-and-right-direction of the lower frame portion 21b to each other.

The movable louver 30 is made of resin, for example. The movable louver 30 includes a plate shape and is provided at an inner side of the frame 20. The movable louver 30 is provided in parallel to the vehicle left-and-right direction. The movable louver 30 includes a shaft portion 33 provided at each end portion in the vehicle left-and-right direction. As the shaft portions 33 are rotatably supported at the frame 20, the movable louver 30 is rotatable about a rotation axis extending in the vehicle left-and-right direction at the frame 20.

The movable louver 30 includes an upper side louver 31 including a right upper louver 31a and a left upper louver 31b, and a lower side louver 32 including a right lower louver 32a and a left lower louver 32b. The movable louver 30 may include each of the right upper louver 31a, the left upper louver 31b, the right lower louver 32a and the left lower louver 32b, or the movable louver 30 may include the plural right upper louvers 31a, the plural left upper louvers 31b, the plural right lower louvers 32a and the plural left lower louver 32b.

The right upper louver 31a is provided between the right frame portion 22a and the central frame portion 22c in the vehicle left-and-right direction, to be positioned at the upper side relative to the up-and-down-direction-center of the frame 20 in the vehicle-up-and-down direction. The left upper louver 31b is provided between the left frame portion 22b and the central frame portion 22c in the vehicle left-and-right direction, to be positioned at the upper side relative to the up-and-down-direction-center of the frame 20 in the vehicle up-and-down direction. The right lower louver 32a is provided between the right frame portion 22a and the central frame portion 22c in the vehicle left-and-right direction, to be positioned at the lower side relative to the up-and-down-direction-center of the frame 20 in the vehicle up-and-down direction. The left lower louver 32b is provided between the left frame portion 22b and the central frame portion 22c in the vehicle left-and-right direction, to be positioned at the lower side relative to the up-and-down-direction-center of the frame 20 in the vehicle up-and-down direction.

Figure 2:
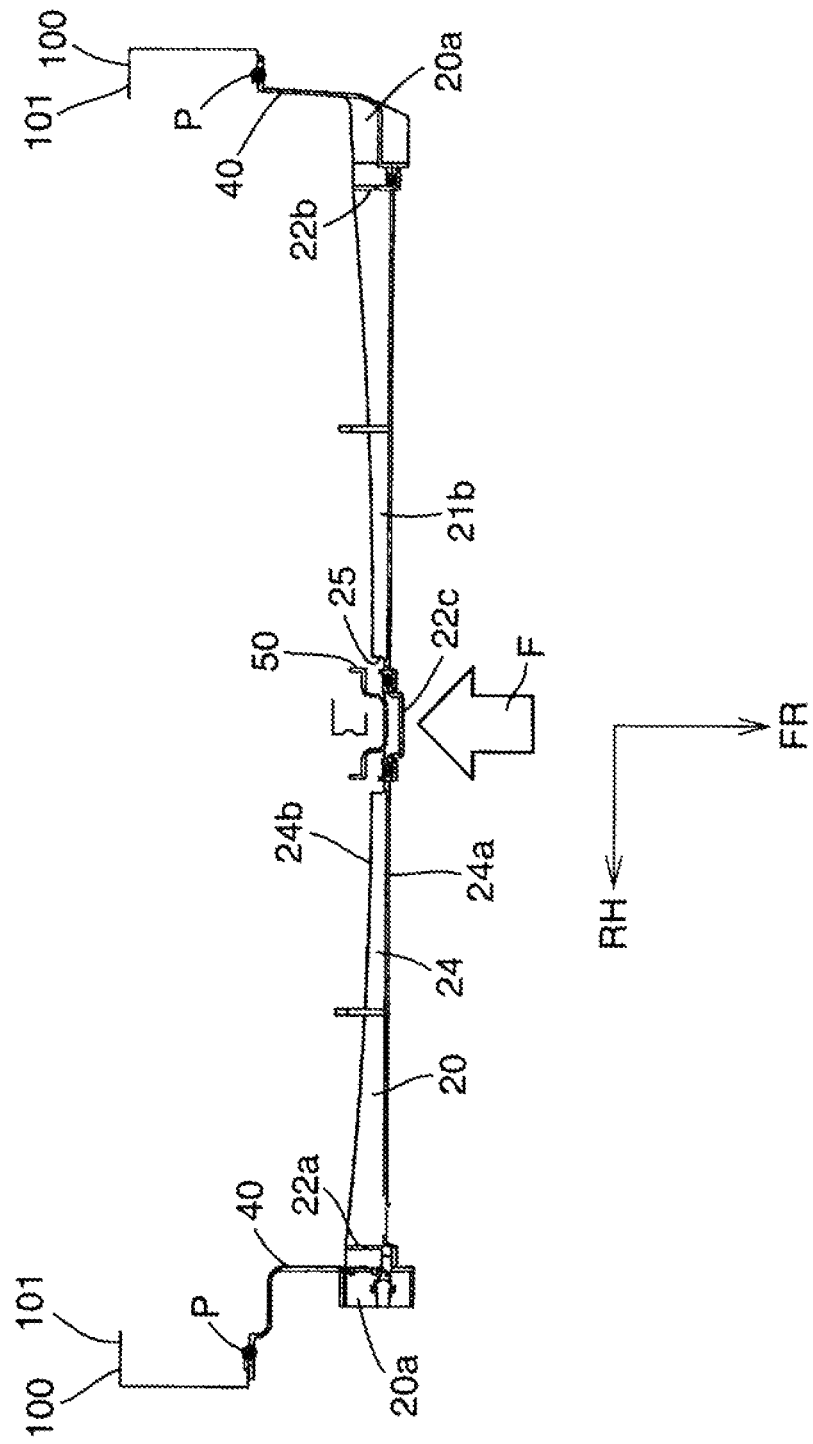
FIG. 2 is a cross sectional view of the grille shutter of the embodiment, in which the presentation of the cross section is omitted for sake of clarification of the drawing.

Each of the right upper louver 31a, the left upper louver 31b, the right lower louver 32a and the left lower louver 32b is configured to be rotated relative to the frame 20 by power of an actuator provided at, for example, an outer side in the vehicle left-and-right direction and/or at the vehicle rear side, relative to the right frame portion 22a. The right upper louver 31a, the left upper louver 31b, the right lower louver 32a and the left lower louver 32b are configured to be moved in synchronization with one another by a link 50 (refer to FIG. 2) provided at the vehicle rear side relative to the central frame portion 22c, for example. Thus, the grille shutter 10 is in an open state allowing the air to flow to the radiator 110 via the grille shutter 10 when all of the right upper louver 31a, the left upper louver 31b, the right lower louver 32a and the left lower louver 32b are rotated to be substantially horizontal. The grille shutter 10 is in a closed state blocking the flow of air to the radiator 110 via the grille shutter 10 when all of the right upper louver 31a, the left upper louver 31b, the right lower louver 32a and the left lower louver 32b are rotated to be substantially vertical. As illustrated in FIG. 1, a harness 150 is to be connected to the actuator.

The bracket 40 is provided at each of both end portions 20a, 20a of the frame 20 in the vehicle left-and-right direction. The brackets 40 are positioned at outer sides of the frame 20 in the vehicle left-and-right direction relative to the right frame portion 22a and the left frame portion 22b, respectively. Each of the brackets 40 is made of resin, for example. The brackets 40 may be formed separately from the frame 20 and be fixedly attached to the frame 20, or may be formed integrally with the frame 20 to reduce the number of parts and components.

The brackets 40 are provided to extend from the vehicle-left-and-right-direction-end portions 20a, 20a of the frame 20, towards the vehicle rear side. A distal end portion (end portion at the vehicle rear side), in the extending direction, of each of the brackets 40 is fastened (joined, connected) to the vehicle body 100 with a bolt, for example.

As described above, the frame 20 of the grille shutter 10 is extended in the vehicle left-and-right direction, and the brackets 40 configured to be fastened to the vehicle body 100 are provided at the vehicle left-and-right direction end portions 20a, 20a of the frame 20. Accordingly, in a case where an external force F including, for example, wind pressure works from the vehicle front side during a normal running of the vehicle, the frame 20 may be deformed or bent towards the vehicle rear side in such a manner that the center of the frame 20 in the vehicle left-and-right direction includes the maximum deformation amount, wherein the said center of the frame 20 is away from support points P, P (refer to FIGS. 2 and 3) at which the brackets 40, 40 generating a body reaction force F1 are supported at the vehicle body 100. Thus, the frame 20 according to the embodiment includes the characteristics that will be described below.

Each of the upper frame portion 21a and the lower frame portion 21b includes an intermediate portion 24 (i.e., a portion) positioned between the right frame portion 22a and the left frame portion 22b in the vehicle left-and-right direction. A vehicle-front-side edge 24a of the intermediate portion 24 is extended linearly in parallel to the vehicle left-and-right direction. However, at least one of the upper frame portion 21a and the lower frame portion 21b includes a curved configuration in which a vehicle-rear-side edge 24b of the intermediate portion 24 is smoothly curved and convexed towards the vehicle-front side. That is, at least one of the upper frame portion 21a and the lower frame portion 21b has an arch shape in which the vehicle-rear-side edge 24b of the intermediate portion 24 includes the convex curved configuration that is convexed towards the vehicle-front side. In the embodiment disclosed here, a case is described in which the vehicle-rear-side edge 24b of only the lower frame portion 21b includes the convex curved configuration.

In a case where the frame portion (for example, the lower frame portion 21b in the embodiment) of which the vehicle-rear-side edge 24b includes the convex curved configuration may interfere with, for example, the link 50 (refer to FIG. 20) provided at the vehicle rear side relative to the central frame portion 22c, the frame portion (for example, the lower frame portion 21b in the embodiment) may be provided with a cutout 25 for avoiding the interference with the link 50. In this case, the vehicle-rear-side edge 24b of the frame portion (for example, the lower frame portion 21b in the embodiment) corresponds to the convex curved configuration except for the cutout 25.

The convex curved configuration is a configuration viewed in the vehicle up-and-down direction. As illustrated in FIG. 3, the convex curved configuration is a left-and-right symmetric configuration with respect to a surface C passing through the center (including a substantially center) of the intermediate portion 24 of the vehicle left-and-right direction and being orthogonal to the vehicle-left-and-right-direction. The center of the intermediate portion 24 in the vehicle left-and-right direction coincides (including substantially coincides) with the center of the frame 20 in the vehicle left-and-right direction. The convex curved configuration may be a circular arc configuration or an elliptical arc configuration, and may ideally be a hyperbolic configuration, when viewed in the vehicle up-and-down direction. Due to a characteristic of a hyperbolic curve of approaching a asymptotic line, when the external force F and the body reaction force F1 are offset or cancelled out with each other in a compression direction at a position which is away from the center of the intermediate portion 24 in the vehicle left-and-right direction, the external force F and the body reaction force F1 are allowed to oppose each other from substantially exact opposite directions. Thus, a rate of the forces F and F1 that are cancelled out with each other can be increased.

Next, operations and effects of the embodiment will be described.

(A) When the grille shutter 10 receives the external force F (wind pressure) from the vehicle front side, the frame 20 tends to deform towards the vehicle rear side because the frame 20 is provided to extend in the vehicle left-and-right direction. On the other hand, when the grille shutter 10 receives the external force F (wind pressure) from the vehicle front side, the body reaction force F1 is generated at the frame 20 via the brackets 40, 40 because the brackets 40, 40 fastened to the vehicle body 100 are provided at the end portions 20a, 20a of the frame 20 in the vehicle left-and-right direction. Because the vehicle-rear-side edge 24b of at least one of the upper frame portion 21a and the lower frame portion 21b includes the curved configuration convexed towards the vehicle front side, the external force F received by the grille shutter 10 from the vehicle front side goes along the vehicle-rear-side edge 24b of the convex curved configuration towards both outer sides of the frame 20 in the vehicle left-and-right direction, and the body reaction force F1 goes along the vehicle-rear-side edge 24b of the convex curved configuration towards the central side of the frame 20 in the vehicle left-and-rear-direction. Thus, the external force F and the body reaction force F1 are offset or cancelled out with each other in the compression direction. Accordingly, rigidity of the frame 20 is enhanced efficiently compared to a case in which the vehicle-rear-side edge 24b of at least one of the upper frame portion 21a and the lower frame portion 21b does not include the convex curved configuration convexed towards the vehicle front side.

(B) Table 1 indicates evaluation of amount or quantity of deformation (rigidity) of the frame (frame portion) 20 when the external force F works on the grille shutter. The three patterns (the first pattern, the second pattern and the third pattern) of grille shutters in table 1 include the frames 20 of which the configurations differ from one another, respectively.

TABLE 1

Evaluation results of frame configuration × deformation amount(rigidity)

| Pattern | L [mm] | | | | Deformation amount [mm] | Cost | Mass | Judgement |
| --- | --- | --- | --- | --- | --- | --- | --- | --- |
| | A-A | B-B | C-C | D-D | | | | |
| Current status | 5 | 5 | 5 | 5 | 25.7 | — | — | x |
| Plan 1 | 35 | 35 | 35 | 35 | 5.5 | x | x | x |
| Final plan | 10 | 18 | 24 | 28 | 5.5 | ○ | ○ | ○ |

Figure 4:
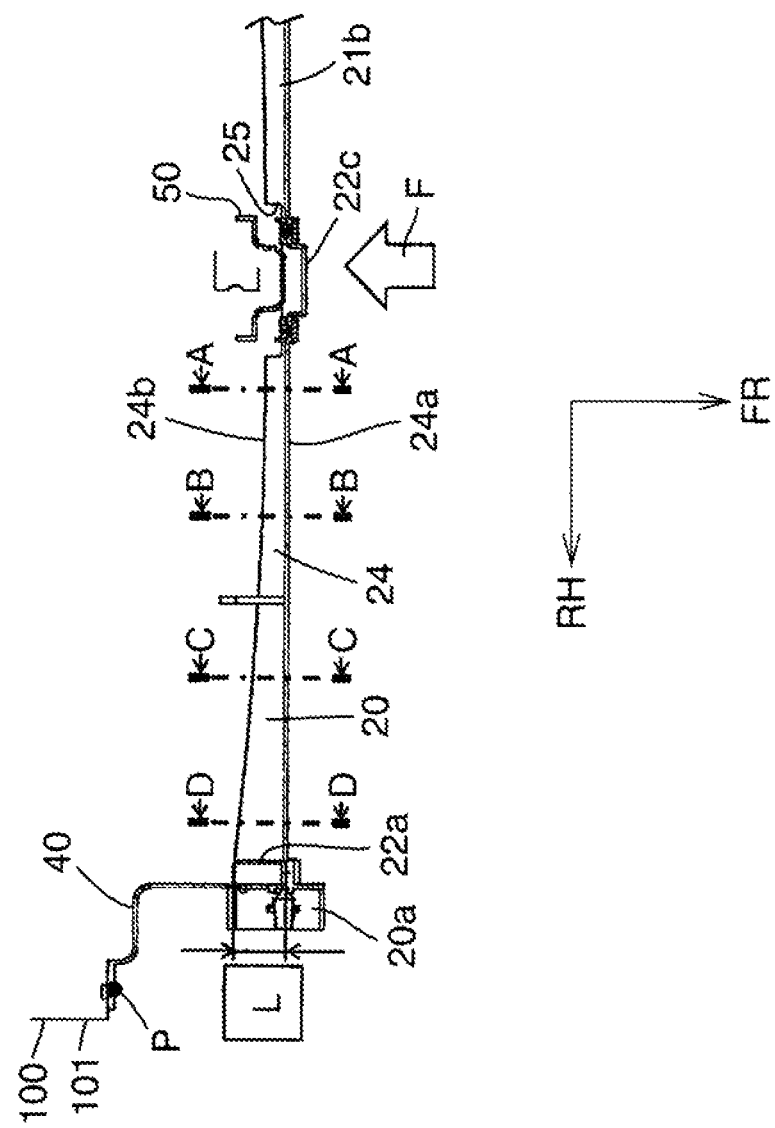
FIG. 4 is a partial cross sectional view of the grille shutter of the embodiment, in which the presentation of the cross sectional is omitted for sake of clarification of the drawings.

The three patterns of grille shutters will be explained in (a) to (c) as follows where a vehicle-front-and-rear-direction length of the frame 20 at each of a portion A-A, a portion B-B, a portion C-C and a portion D-D of frame 20 illustrated in FIG. 4 corresponds to a length L. (a) According to the first pattern (current status), L=5 mm at each of the portion A-A, the portion B-B, the portion C-C and the portion D-D. (b) The second pattern (plan 1) includes a uniformly larger frame configuration than the first pattern (current status).

Specifically, L=35 mm at each of the portion A-A, the portion B-B, the portion C-C and the portion D-D. (c) In the third pattern (final plan), the frame includes the convex curved configuration (hyperbolic configuration) of the embodiment. Specifically, L=10 mm at the portion A-A, L=18 mm at the portion B-B, L=24 mm at the portion C-C, and L=28 mm at the portion D-D.

In Table 1, the sixth column from the left side indicates the deformation amount (rigidity) of each pattern. The seventh and eighth columns indicate the evaluations of each pattern from the aspects of cost and mass, respectively. The ninth column indicates the judgement result of each pattern on the basis of the evaluations of sixth to eighths columns.

Table 1 indicates the following. According to the evaluation results, the deformation amount (rigidity) of the second pattern (plan 1) is 5.5 mm and the deformation amount (rigidity) of the third pattern (final plan) is 5.5 mm, which are equivalent to each other. The deformation amount of each of the second pattern and the third pattern is smaller than the deformation amount of the first pattern (current status), that is, the rigidities of the second and third patterns are enhanced. However, the third pattern (final plan) including the convex curved configuration (hyperbolic configuration) is more advantageous than the second pattern (plan 1) from the aspects of cost and mass as indicated by the circles in the table. Consequently, the third pattern (final plan) is more advantageous from all the aspects of rigidity, cost and mass.

(C) Since the frame 20 is provided to extend in parallel to the vehicle-left-and-right direction, a length of the grille shutter 10 in the vehicle-front-and-rear direction is reduced compared to a case where the frame 20 is arranged to be slanted or inclined relative to the direction that is parallel to the vehicle-left-and-right direction. As a result, a mount space of the grille shutter 10 in the vehicle-front-and-rear direction can be reduced, and accordingly the grille shutter 10 is easily mountable on a vehicle which includes a relatively short front overhanging and is typically represented by a minivan, for example.

(D) Although at least one of the upper frame portion 21a and the lower frame portion 21b includes the convex curved configuration in which the vehicle-rear-side edge 24b includes the curved configuration convexed towards the vehicle-front side, the vehicle-front-side edge 24a includes the linear configuration extended linearly in the vehicle width direction. Thus, the length of the frame (frame portion) 20 in the vehicle-front-and-rear direction can be reduced compared to a case in which also the vehicle-front-side edge 24a includes the convex curved configuration convexed towards the vehicle-front side similarly to the vehicle-rear-side edge 24b. Accordingly, the length of the grille shutter 10 in the vehicle-front-and-rear direction can be reduced. As a result, a mount space of the grille shutter 10 in the vehicle-front-and-rear direction can be reduced, and accordingly the grille shutter 10 is easily mountable on a vehicle which includes a relatively short front overhanging and is typically represented by a minivan, for example.

(E) Since the brackets (portion portions) 40 are provided at the vehicle-left-and-right direction end portions 20a, 20a of the frame 20 and extending towards the vehicle rear side, the body reaction force F1 is generated efficiently from the vehicle rear side to the vehicle front side when the grille shutter 10 receives the external force (wind pressure) F from the vehicle front side and the frame 20 tends to deflect towards the vehicle rear side.

The vehicle-rear-side edge 24b of at least one of the upper frame portion 21a and the lower frame portion 21b is readily formed to include the convex curved configuration. (F) Consequently, the grille shutter 10 of the embodiment is advantageous in cost reduction and weight reduction compared to a case in which a separate part which is different from the frame 20 is provided for reducing the deformation amount of the frame 20 (for example, a case in which a separate part including a stay that is different from the frame 20 is provided at a front side or a rear side of the center portion, in the left-and-right direction, of the frame 20). (G) Further, the existing frame structure needs to be only modified or enhanced, and thus the present disclosure is easily applicable to all the vehicles including the frame structure.

According to the aforementioned embodiment, the grille shutter 10 configured to be mounted on the vehicle front portion includes the frame 20 provided to extend in parallel to the vehicle-left-and-right direction, the movable louver 30 supported by the frame 20, and the bracket 40 provided at each of the end portions 20a, 20a of the frame 20 and configured to be fastened to the vehicle body 10, the end portions 20a, 20a corresponding to both end portions in the vehicle-left-and-right direction. The frame 20 includes the upper frame portion 21a provided to extend in the vehicle-left-and-right direction, and the lower frame portion 21b provided at a lower side relative to the upper frame portion 21a and extending in the vehicle-left-and-right direction. The frame 20 includes the right frame portion 22a provided to extend in the up-and-down direction and connecting the right-side end portion of the upper frame portion 21a and the right-side end portion of the lower frame portion 21b to each other, the right-side end portions corresponding to the right-side end portions in the vehicle-left-and-right direction. The frame 20 includes the left frame portion 22b provided to extend in the up-and-down direction and connecting the left-side end portion of the upper frame portion 21a and the left-side end portion of the lower frame portion 21b to each other, the left-side end portions corresponding to the left-side end portions in the vehicle-left-and-right direction. At least one of the upper frame portion 21a and the lower frame portion 21b includes the curved configuration in which the vehicle-rear-side edge 24b of the intermediate portion 24 (i.e., the portion) of the one of the upper frame portion 21a and the lower frame portion 21b is convex towards the vehicle-front side, and the intermediate portion 24 is positioned between the right frame portion 22a and the left frame portion 22b.

According to the above-described configuration, when the grille shutter 10 receives the external force F (wind pressure) from the vehicle front side, the frame 20 tends to deform towards the vehicle rear side because the frame 20 extending in the vehicle left-and-right direction is provided. On the other hand, when the grille shutter 10 receives the external force F (wind pressure) from the vehicle front side, the body reaction force F1 is generated at the frame 20 via the brackets 40, 40 because the end portions 20a, 20a of the frame 20 in the vehicle left-and-right direction are provided with the respective brackets 40, 40 that are fastened to the vehicle body 100. Because the vehicle-rear-side edge 24b of at least one of the upper frame portion 21a and the lower frame portion 21b includes the curved configuration convexed towards the vehicle front side, the external force F received by the grille shutter 10 from the vehicle front side goes towards the both outsides, in the vehicle left-and-right direction, of the frame 20 along the vehicle-rear-side edge 24b of the convex curved configuration. The body reaction force F1 go towards the center, in the vehicle left-and-right direction, of the frame 20 along the vehicle-rear-side edge 24b of the convex curved configuration. Thus, the external force F and the body reaction force F1 are offset or cancelled out with each other in the compression direction. Accordingly, the rigidity of the frame 20 is enhanced efficiently compared to a case in which the vehicle-rear-side edge 24b of at least one of the upper frame portion 21a and the lower frame portion 21b does not include the convex curved configuration towards the vehicle front side.

Further, as the frame 20 is provided to extend in parallel to the vehicle-left-and-right direction, the length of the grille shutter 10 in the vehicle-front-and-rear direction can be reduced compared to a case where the frame 20 is arranged to be slanted with respect to the direction that is parallel to the vehicle-left-and-right direction. As a result, the mount space of the grille shutter 10 in the vehicle-front-and-rear direction can be reduced, and accordingly the grille shutter 10 is mountable on a vehicle which includes a relatively short front overhanging and is typically represented by a minivan, for example.

According to the aforementioned embodiment, at least the one of the upper frame portion 21a and the lower frame portion 21b includes the vehicle-front-side edge 24a of the intermediate portion 24 positioned between the right frame portion 22a and the left frame portion 22b, and the vehicle-front-side edge 24a being provided to extend linearly in parallel to the vehicle-left-and-right direction.

According to the above-described configuration, the length of the frame 20 in the vehicle-front-and-rear direction can be reduced compared to a case in which also the vehicle-front-side edge 24a includes the convex curved configuration convexed towards the vehicle-front side similarly to the vehicle-rear-side edge 24b. As a consequence, the length of the grille shutter 10 in the vehicle-front-and-rear direction can be reduced, and accordingly the grille shutter 10 is mountable on a vehicle which includes a relatively short front overhanging and is typically represented by a minivan, for example.

According to the aforementioned embodiment, the brackets 40, 40 are provided at the end portions 20a, 20a of the frame 20 to extend towards the vehicle rear side.

According to the above-described configuration, the body reaction force F1 is generated efficiently from the vehicle rear side to the vehicle front side when the frame 20 is to deflect towards the vehicle rear side in a case where the grille shutter 10 receives the external force (wind pressure) from the vehicle front side.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A grille shutter configured to be mounted on a vehicle front portion, the grille shutter comprising:
    a frame provided to extend in parallel to a vehicle-left-and-right direction;
    a movable louver supported by the frame;
    a bracket provided at each of end portions of the frame and configured to be fastened to a vehicle body, the end portions corresponding to both end portions in the vehicle-left-and-right direction; and
    the frame including:
        an upper frame portion provided to extend in the vehicle-left-and-right direction;
        a lower frame portion provided at a lower side relative to the upper frame portion and extending in the vehicle-left-and-right direction;
        a right frame portion provided to extend in an up-and-down direction and connecting a right-side end portion of the upper frame portion and a right-side end portion of the lower frame portion to each other, the right-side end portions corresponding to right-side end portions in the vehicle-left-and-right direction; and
        a left frame portion provided to extend in the up-and-down direction and connecting a left-side end portion of the upper frame portion and a left-side end portion of the lower frame portion to each other, the left-side end portions corresponding to left-side end portions in the vehicle-left-and-right direction, wherein
    at least one of the upper frame portion and the lower frame portion includes a curved configuration in which a vehicle-rear-side edge of a portion of the one of the upper frame portion and the lower frame portion is convex towards a vehicle-front side, and the portion is positioned between the right frame portion and the left frame portion,
    wherein a vehicle-front-side edge of the frame is positioned between the right frame portion and the left frame portion, the vehicle-front-side edge extending linearly in parallel to the vehicle-left-and-right direction.

2. The grille shutter according to claim 1, wherein at least the one of the upper frame portion and the lower frame portion includes the vehicle-front-side edge.

3. The grille shutter according to claim 1, wherein the brackets are provided at the end portions of the frame to extend towards a vehicle rear side.

4. The grille shutter according to claim 2, wherein the brackets are provided at the end portions of the frame to extend towards a vehicle rear side.

5. The grille shutter according to claim 2,
    wherein the vehicle-rear-side edge, extending between the right frame portion and the left frame portion, of the upper frame portion and of the lower frame portion are each convex towards the vehicle-front side, and
    wherein the vehicle-front-side edge, extending between the right frame portion and the left frame portion, of the upper frame portion and of the lower frame portion extend linearly in parallel to the vehicle-left-and-right direction.

* * * * *